United States Patent
Drews et al.

(10) Patent No.: US 7,461,260 B2
(45) Date of Patent: Dec. 2, 2008

(54) METHODS AND APPARATUS FOR FINDING A SHARED SECRET WITHOUT COMPROMISING NON-SHARED SECRETS

(75) Inventors: Paul C. Drews, Gaston, OR (US); David M. Wheeler, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 983 days.

(21) Appl. No.: 10/334,851

(22) Filed: Dec. 31, 2002

(65) Prior Publication Data

US 2004/0128517 A1 Jul. 1, 2004

(51) Int. Cl.
*H04L 29/00* (2006.01)

(52) U.S. Cl. .................. 713/180; 713/155; 713/156; 713/168; 713/169; 713/170; 713/175; 713/176; 713/182; 380/30; 380/270

(58) Field of Classification Search .............. 713/176, 713/155, 156, 170, 175, 168, 169, 180, 182; 380/270, 30
See application file for complete search history.

(56) References Cited

U.S. PATENT DOCUMENTS

| | | | |
|---|---|---|---|
| 6,560,706 B1 | 5/2003 | Carbajal et al. | 713/155 |
| 6,578,131 B1* | 6/2003 | Larson et al. | 711/216 |
| 6,611,869 B1* | 8/2003 | Eschelbeck et al. | 709/228 |
| 6,802,002 B1* | 10/2004 | Corella | 713/175 |
| 6,820,199 B2* | 11/2004 | Wheeler et al. | 713/170 |
| 6,976,162 B1* | 12/2005 | Ellison et al. | 713/156 |
| 7,251,635 B2* | 7/2007 | Lam et al. | 705/79 |
| 7,263,560 B2* | 8/2007 | Abdelaziz et al. | 709/238 |
| 2002/0018570 A1 | 2/2002 | Hansmann et al. | |
| 2002/0124172 A1* | 9/2002 | Manahan | 713/176 |
| 2003/0101344 A1* | 5/2003 | Wheeler et al. | 713/170 |
| 2003/0115151 A1* | 6/2003 | Wheeler et al. | 705/64 |
| 2003/0177361 A1* | 9/2003 | Wheeler et al. | 713/176 |
| 2004/0005051 A1* | 1/2004 | Wheeler et al. | 380/28 |
| 2004/0030901 A1* | 2/2004 | Wheeler et al. | 713/176 |

(Continued)

FOREIGN PATENT DOCUMENTS

EP 0 539 726 A2 5/1993

(Continued)

OTHER PUBLICATIONS

Rahouma, "Utilization of Multiple Block Cipher Hashing in Authentication and Digital Signature", IEEE, pp. 257-261.*

(Continued)

*Primary Examiner*—Kambiz Zand
*Assistant Examiner*—Tongoc Tran
(74) *Attorney, Agent, or Firm*—Hanley, Flight & Zimmerman, LLC

(57) ABSTRACT

Methods and apparatus for finding a shared secret without compromising non-shared secrets are disclosed. The methods and apparatus receive a first group of hashed secrets from a communication device and compare the first group of hashed secrets to a second group of hashed secrets associated with an application server. A shared secret is identified among the first and second groups of hashed secrets. An application associated with the shared secret is sent to the communication device via a communication channel.

14 Claims, 5 Drawing Sheets

U.S. PATENT DOCUMENTS

| | | | |
|---|---|---|---|
| 2004/0128508 A1* | 7/2004 | Wheeler et al. | 713/170 |
| 2005/0039016 A1* | 2/2005 | Aissi et al. | 713/176 |
| 2005/0149730 A1* | 7/2005 | Aissi et al. | 713/168 |

FOREIGN PATENT DOCUMENTS

| | | |
|---|---|---|
| EP | 0940945 | 9/1999 |
| WO | 02091704 | 11/2002 |

OTHER PUBLICATIONS

Kara, "Secure Remote Access from Office to Home", IEEE Communication Magazine, Oct. 2001, pp. 68-72.*

*What is MExE?* [retrieved on Dec. 10, 2002]. Retrieved from the Internet URL<http://www.mobilemexe.com/whatismexe.htm>. 5 sheets.

*Secure Hash Standard.* [retrieved on Jul. 3, 2003]. Retrieved from the Internet URL<http://www.itl.nist.gov/fipspubs/fip180-1.htm>. Federal Information Processing Standards, Apr. 17, 1995.

Carts, D. *A Review of the Diffie-Hellman Algorithm and its Use in Secure Internet Protocols.* SANS Institute, 2001, pp. 1-7.

*SET Secure Electronic Transaction Specification; Book 2: Programmer's Guide.* May 31, 1997.

*SET Secure Electronic Transaction Specification; Book 3: Formal Protocol Definition.* May 31, 1997.

*SET Secure Electronic Transaction Specification; Book 1: Business Description.* May 31, 1997.

"International Search Report." Apr. 29, 2004, Patent Cooperation Treaty.

Menezes, V. "Handbook of Applied Cryptography." 1997, CRC Press LLC. pp. 321-322, 330, 359-361, 364-366, 515-516.

Schneier, B. "Applied Cryptography Second Edition." 1996, John Wiley & Sons. XP-002278442. pp. 58-59.

Menezes, V. "Handbook of Applied Cryptography." 1997, CRC Press LLC. pp. 330, 362, 397, and 417. Internet URL: http://www.cacr.math.uwaterloo.ca/hac/.

Examination Report under Section 18(3) corresponding to Great Britain application No. GB0509948.6, Oct. 13, 2005, 4 pages.

Menezes, V. "Handbook of Applied Cryptography." 1997, CRC Press LLC. pp. 359-366, 385, 395-397, 515, 516, 588, and 589. Internet URL: http://www.cacr.math.uwaterloo.ca/hac/.

Menezes, Oorschot and Vanstone. Handbook of Applied Cryptography. pp. 321-366; 515 and 516. Copyright 1997 by CRC Press, Inc.

German Language version of German Office Action dated Mar. 6, 2008, for German Application 10393847.8, 11 pages.

English Translation of German Language version of German Office Action dated Mar. 6, 2008, for German Application 10393847.8, 6 pages.

* cited by examiner

METHODS AND APPARATUS FOR FINDING A SHARED SECRET WITHOUT COMPROMISING NON-SHARED SECRETS

FIELD OF THE DISCLOSURE

The present disclosure relates generally to secure data communications and, more specifically, to methods and apparatus for finding a shared secret without compromising non-shared secrets.

BACKGROUND

The need for secure data communications or transfers has increased dramatically as the use of networked communications, particularly wireless communications (e.g., cellular communications), has become more accessible and widespread. For example, many mobile communication systems enable mobile clients (e.g., smart mobile phones, personal data assistants, etc.) to download software and access other data and/or services provided by data/application servers.

To provide a more secure environment for these mobile communication systems, mobile clients and servers may use a managed execution environment that provides a security function, which may be used to prevent unauthorized users from gaining access to data within the mobile clients and/or the data/application servers. For example, the Mobile Station Application Execution Environment (MExE) is a well-known wireless communication protocol that may be used with smart mobile phones and other mobile client devices to increase the security of data transactions between the mobile devices and the data/application servers.

Under the MExE security model, each mobile client device holds one or more digital certificates that designate the identity of the application server that must digitally sign software to enable that mobile client device to download and execute software from that application server. In other words, for a mobile client to download and execute an application provided by a server, the mobile client must hold a digital certificate that corresponds to (e.g., is identical to) a digital certificate held by the server. Typically, application servers that supply software to mobile clients have multiple digital signatures of the software available for downloading. Each of these digital signatures may be created using a different digital certificate associated with a party authorized to create the software (e.g., a device manufacturer, a service provider, a software provider, etc.).

As is well known, a digital signature is typically generated by encrypting (e.g., using a private key from a public-private key combination) the hash of a message (e.g., a software application, a document, etc.) to be sent. In this manner, a digital signature can be used by a receiving entity to determine the identity of the originating entity and to determine that the received message has not been altered from what was sent by the originating entity. A digital certificate, on the other hand, typically contains a name (e.g., a user name), a serial number, a public key for encrypting data, expiration dates, and the signature of a certifying authority (certificate authority). In general, a digital certificate may be used to establish the credentials of an entity within a communication system or network and the public key portion of the certificate may be used to check or verify digital signatures.

In many mobile communication systems, the mobile clients freely provide or publish their digital certificates when negotiating a data transfer (i.e., establishing a communication link for data exchange) with another party (e.g., an application server). Similarly, application servers within these mobile communication systems may freely provide information relating to the digital signatures of available software or other data to clients requesting access to that software or other data.

Although it is generally desirable to provide digital signature and digital certificate information only to known authorized entities within the communication network to maintain a high degree of network security, existing systems typically require this information to be released during the initial stages of a data transfer negotiation. Unfortunately, the release of digital certificate information or digital signature information during initial negotiations between two or more parties within a communication network can compromise the security of the network. In particular, the party releasing the digital certificate or signature information is typically unable to distinguish an authorized requesting entity from an attacker. Thus, if an attacker determines what digital certificates are authorized by, for example, a particular client device, the attacker can concentrate its efforts on overcoming a specific digital certificate. Likewise, if the attacker determines what digital signatures are authorized by a particular server, the attacker can concentrate its efforts on overcoming a specific digital signature.

DETAILED DESCRIPTION

As used herein, the term "secret" generally refers to secure data or information that is not published or freely distributed within a communication system or network. In some example systems, a secret may be a digital signature, a digital certificate, or some other information associated with a communication device, server, etc. that is not freely transmitted to entities requesting information. A "shared secret" refers to a secret that is common to (i.e., held by) more than one entity within the communication network or system. For example, a communication device and an application or data server within a communication system or network may both hold identical or corresponding digital certificates, thereby authorizing the communication device to download application information and/or other data from the server. However, entities sharing one or more secrets do not necessarily know that they share those secrets with another entity.

On the other hand, a "non-shared" secret refers to a secret that is not shared or commonly held between two or more entities. However, a non-shared secret for a first group of entities may be a shared secret for a second group of entities, even if the first and second groups of entities have common entity members. Thus, a determination of whether a secret is shared or non-shared must be referenced to a particular group of entities.

Figure 1:
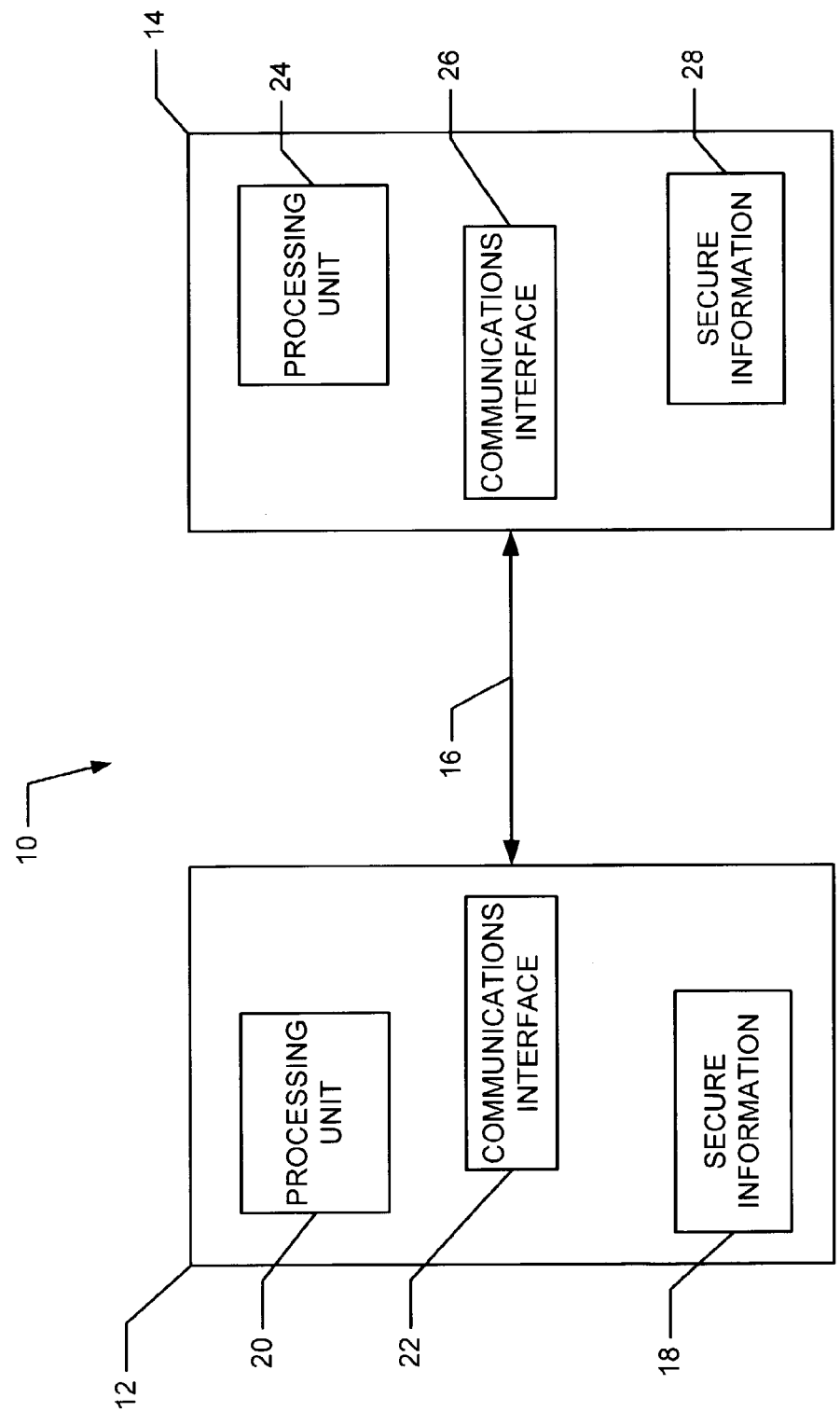
FIG. 1 is a block diagram of an example system that may use the methods described herein to find one or more shared secrets without compromising non-shared secrets between entities negotiating a data transfer.

FIG. 1 is a block diagram of an example system 10 that may use the methods described herein to find one or more shared secrets without compromising non-shared secrets between entities negotiating a data transfer. The example system 10 includes a first party or entity 12 and a second party or entity 14, each of which is coupled to a communication channel 16. The communication channel 16 may include a packet-switched network such as, for example, the Internet, telephone lines, a wireless communication network(s) such as, for example, a cellular communications network, satellite links, etc. More generally, the communication channel 16 may be implemented using any combination of media, platforms and/or protocols that enable the conveyance of information. Thus, the communication channel 16 may be public (e.g., in a case where the communication channel 16 includes the Internet) or private (e.g., in a case where the communication channel 16 uses only a local area network, phone lines, etc.)

The first party or entity 12 includes secure information 18, which preferably includes secrets such as data or information, which may be in the form of a list, table, etc., that is not freely transmitted on the communication channel 16 and which is not exposed or revealed to the second entity 14, or any other entities (not shown) coupled to the system 10. The first party or entity 12 also includes a processing unit 20, which may be implemented using any circuit or device capable of executing data or instructions to carry out the methods described herein, such as the example processor system shown and described in connection with FIG. 5 below. In addition, the first entity 12 includes a communications interface 22, which enables the first entity 12 to communicate, if needed, via the communication channel 16. For example, in a case where the communication channel 16 includes phone lines, the communications interface 22 may include a modem and, in a case where the communication channel 16 includes a wireless network, the communications interface 22 may include a wireless transceiver.

Similar to the first party or entity 12, the second party or entity 14 includes secure information 28, a processing unit 24 and a communications interface 26. However, some or all of the secure information 28 held by the second entity 14 may be different from the secure information 18 held by the first entity 12. Further, while FIG. 1 depicts the system 10 as having only two entities or parties, additional entities or parties may be included and coupled to the communication channel 16.

Figure 2:
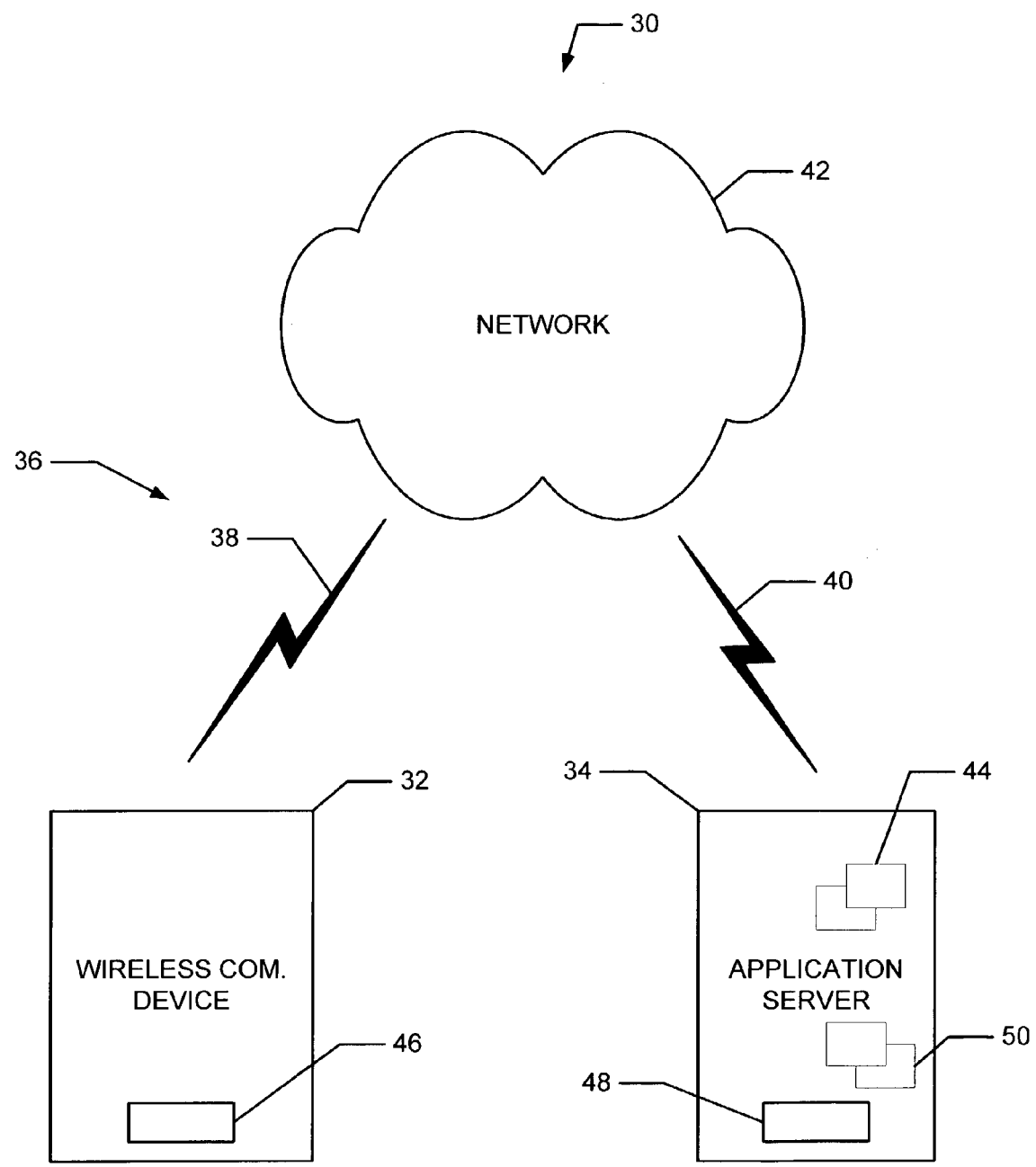
FIG. 2 is a block diagram depicting an example manner in which the system shown FIG. 1 may be implemented.

FIG. 2 is a block diagram depicting an example manner in which the system 10 shown in FIG. 1 may be implemented. The example shown in FIG. 2 is a wireless communication system 30 that includes a wireless mobile communication device or client 32 that can communicate with an application server 34 via a communication channel 36. The communication channel 36 includes one or more wireless communication links 38 and 40 and a switched-packet network 42, which may, for example, be the Internet.

The mobile communication device 32 may be, for example, a smart cellular phone, a PDA, a laptop computer having a wireless communications interface, etc. that is configured to communicate as a client of the application server 34 via the communication channel 36. The application server 34 may be implemented using a workstation or any other computer or processing system. The application server 34 includes one or more software applications and/or other data or information 44 available for downloading to and execution or use by mobile communication devices such as, for example, the mobile communication device 32.

The mobile communication device 32 includes or holds one or more digital certificates 46, which have not been revealed to (i.e., have been kept secret from) at least some other entities (e.g., the server 34) within the system 30. The digital certificates 46 secretly held by the communication device 32 correspond to one or more software applications or other data or information that the communication device 32 is authorized to transfer or download from other entities within the system 30. For purposes of discussion, at least one of the digital certificates 46 held by the communication device 32 authorizes the communication device 32 to download at least one of the software applications or other data or information 44 stored within the server 34. Thus, the mobile communication device 32 may hold a plurality of digital certificates, each of which may, for example, authorize the communication device 32 to download a different one or subset of the software applications or other data 44 stored within the server 34. However, in other examples, the digital certificates 46 held by the communication device 32 may not authorize the communication device 32 to download any of the software applications or other data 44 from the application server 34. Instead, the communication device 32 may be authorized to transfer (e.g., download) data, applications, etc. from other entities or parties (e.g., other servers, which are not shown) within the system 30.

Similar to the wireless communication device 32, the application server 34 holds one or more digital certificates 48 that have not been revealed to at least some other entities (i.e., have been kept secret or secure) within the system 30. The digital certificates 48 held by the application server 34 correspond to the one or more applications or other data 44 available for download within the system 30. Thus, each of the digital certificates 48 may correspond to a particular one or subset of the applications or other data 44. As noted above, for purposes of discussion, at least one of the digital certificates 48 corresponds to a one or subset of the applications or other data 44 that the communication device 32 is authorized to download from the server 34. In addition to the software applications or other data 44, the application server 34 also includes digital signatures 50 of the applications or other data 44. Each of the digital signatures 50 is generated using a private key that corresponds to a public key associated with one of the digital certificates 48.

Figure 3:
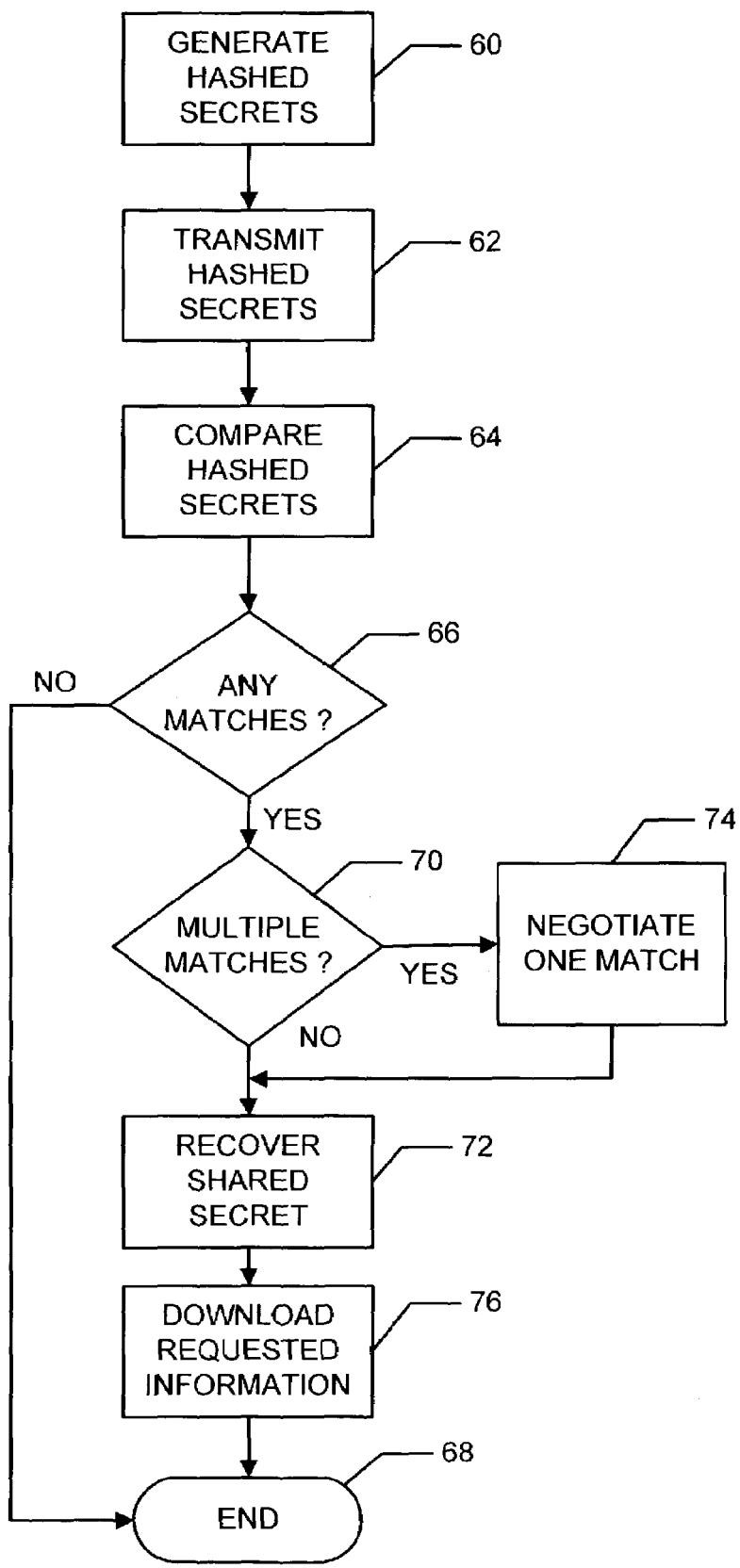
FIG. 3 is a flow diagram of an example manner in which the systems shown in FIGS. 1 and 2 may be configured to find one or more shared secrets without compromising non-shared secrets when negotiating a data transfer between entities.

FIG. 3 is a flow diagram of an example manner in which the systems 10 and 30 shown in FIGS. 1 and 2 may be configured to find one or more shared secrets without compromising non-shared secrets while negotiating a data transfer. For purposes of discussion, the method depicted in FIG. 3 is described in connection with the example system 30 shown in FIG. 2. However, the method depicted in FIG. 3 is generally applicable to any system in which two or more entities negotiate to find a secret that each entity holds.

In a case where the communication device 32 is in communication with the server 34 via the communication link 36 and initiates a negotiation for a transfer of one of the applications or other data 44, the communication device 32 and the application server 34 generate hashed secrets by generating hashed versions of their respective digital certificates 46 and 48 (block 60). Any desired hashing function such as, for example, SHA-1, may be used to hash the digital certificates 46 and 48. As is known, a hashing function typically computes a mathematical summary of the information being hashed. As a result, hashing a digital certificate composed of 4096 bytes of information may result in a hashed version of that digital certificate that can be represented using only twenty bytes. Hashing functions and their operation are well known and, thus, are not described in greater detail herein.

The hashed versions of the digital certificates 46 (i.e., the secrets) held by the communication device 32 are sent or transmitted to the application server 34 (block 62). As a result, the application server 34 holds a hashed version of its digital certificates 48 and a hashed version of the digital certificates 46 received from the communication device 32. The application server 34 then compares the hashed version of its digital certificates 48 to the hashed version of the digital certificates 46 it receives from the communication device 32 (block 64). Based on the comparison, the application server 34 determines if there are any matching hashed digital certificates (i.e., matching hashed secrets) (block 66). If there are no matching hashed secrets (i.e., the negotiating entities do not share any secrets) (block 66), the wireless communication device 32 is not authorized to download the requested information (e.g., one or more of the applications or other data 44) and the negotiation ends (block 68). On the other hand, if at least one match is found at block 66, the application server 34 determines if there are a plurality of matches (block 70) and, if only one match is found, the application server 34 uses the known relationship between the matched hashed digital certificate and the original digital certificate to recover the original shared digital certificate (i.e., the original shared secret) (block 72). Once the match has been found and the shared secret recovered, the communication device 32 uses the recovered secret to download the requested information (e.g., one or more of the applications or other data 44) from the application server 34 (block 76). Preferably, the application server 34 uses the matched original digital certificate to find a corresponding one of the applications or other data 44, as well the corresponding one of the digital signatures, and downloads the corresponding application along with its digital signature to the communication device 32.

If more than one match is found (block 70), the wireless communication device 32 and the application server 34 negotiate to select a single match (block 74) prior to recovering the matched or shared digital certificate (block 72). To facilitate the selection of a single match at block 74, the communication device 32 may generate hashes of its digital certificates 46 using a predefined prioritization scheme. For example, digital certificates associated with manufacturers may be hashed first, digital certificates associated with carriers may be hashed second, and digital certificates associated with third-parties may be hashed last. The hashed digital certificates may then be stored in a list according to their priority (e.g., their order of hashing). In this manner, when the application server 34 receives the prioritized hashed list from the communication device 32 and compares the hashed digital certificates in that list to the hashed version of its digital certificates 48 (block 64), it can select the earliest found match as the single, negotiated match (block 74), despite the fact that other lower priority matches may remain in the list. In addition to the technique described above, there are many well-known techniques (which are not discussed in more detail herein) that may be used to negotiate one match (block 74).

Once a single match has been found and agreed on by the communication device 32 and the application server 34 (i.e., the negotiating parties or entities) (block 74) and the original secret has been recovered (block 72), the communication device 32 is authorized to download the requested one of the applications or other data 44 that corresponds to the matched certificate. Accordingly, the application server 34 downloads the requested one of the applications or other data 44 and, if requested, its corresponding one of the digital signatures 50 to the communication device 32 via the communication link 36.

Although it is not necessary, it may be desirable in some examples for each negotiating entity to receive a copy of the hashed digital certificates from the other negotiating entity (i.e., for the entities to exchange hashed secrets) and for each of the entities to make a comparison of its own hashed secrets to the hashed version of the secrets received from the other entity. Thus, in the case of the example system 30 shown in FIG. 3, the application server 34 may send or transmit (at block 62 or in a subsequent message) a hashed version of the digital certificates 48 to the communication device 32. In that case, the communication device 32 may make its own comparison of hashed secrets (block 64), determine if there are one or more matches (blocks 66 and 70) and may select a single match (block 74), independent from or in cooperation with the application server 34.

Figure 4:
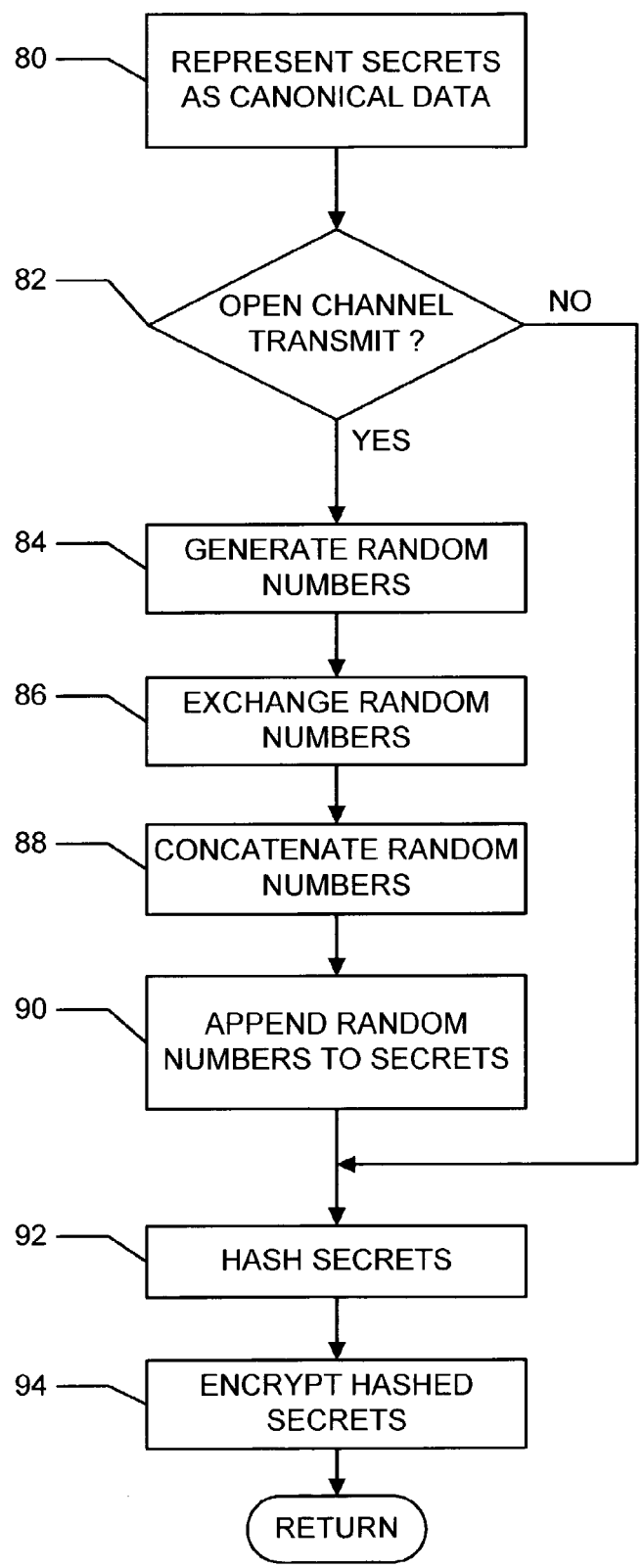
FIG. 4 is a detailed flow diagram of an example manner in which hashed secrets may be generated for use with the example method shown in FIG. 3.

FIG. 4 is a detailed flow diagram of an example manner in which hashed secrets (e.g., hashed digital certificates) may be generated for use with the technique shown in FIG. 3. The entities generating hashed secrets (e.g., the communication device 32 and the application server 34) represent their secrets (e.g., their respective digital certificates 46 and 48) as canonical data (i.e., in a predefined format) (block 80). The entities involved in the negotiation for the data transfer then determine whether the data is to be transferred (e.g., that an application is to be downloaded) via an open communication channel (block 82). For example, in the case where the communication device 32 is negotiating or requesting the application server 34 to download one of the applications or other data 44 via the communication link 36, an open channel transmission is involved. Namely, because the Internet 42 is an open communication channel, the entire communication channel 36 is considered open.

If it is determined at block 82 that the information is to be transferred via an open communication channel, the entities augment their hashed secrets with a random number by, for example, carrying out the steps described in connection with blocks 84 through 90 below. In particular, each of the entities (e.g., the communication device 32 and the application server 34) generates a random number (block 84) and exchange their random numbers via the open communication channel (e.g., the communication channel 36) (block 86). Preferably, but not necessarily, each of the random numbers is composed of at least sixty-four bits. The communication device 32 and the application server 34 then concatenate the random numbers (e.g., to form a one hundred twenty-eight bit number) that is used as a key (block 88). The concatenated random numbers are then appended to the secrets (block 90).

The secrets are hashed at block 92. In the case where an open channel transmission of the secrets is to occur (block 82) and, thus, random numbers are used to augment the secrets (e.g., by carrying out the activities described in connection with blocks 84 to 90), the concatenated random numbers are hashed together with the secrets to which they are appended. On the other hand, in the case where an open channel transmission of the secrets will not occur, the secrets are directly hashed (i.e., without any random number augmentation) at block 92.

After augmentation, the hashed secrets may optionally be encrypted (block 94) using, for example, the public key (from a private-public key combination) from the entity to which the hashed encrypted secrets are to be sent. For example, the communication device 32 would use the public key for the application server 34 to encrypt the hashed version of the secrets 46 (i.e., the digital certificates). The hashed secrets may be encrypted at block 94 as a group or individually.

Following the transmission or exchange of encrypted hashed secrets (FIG. 3, block 62), in a case where the secrets have been augmented with one or more random numbers and where the hashed secrets have been encrypted, the entities may compare the hashed secrets to identify matches in the usual manner (i.e., block 64).

The use of random number augmentation (blocks 84 to 90) and encryption (block 94) for open channel communications can prevent an attacking entity from acquiring a copy of transmitted hashed secrets and using those hashed secrets to discover the secrets of other entities within the communication system. For example, an attacking entity could conceivably obtain a copy of transmitted hashed secrets and compare those hashed secrets to hashed versions of secrets it already has, thereby possibly enabling the attacking entity to gain access to information in the entity that originated the transmitted hashed secrets. Additionally or alternatively, the attacking entity could use the copy of the transmitted hashed secrets in a subsequent communication to falsely claim that a match was found (block 66 of FIG. 2), thereby tricking the entity that originated the transmitted hashed secrets into revealing the original secret. While the example method shown in FIG. 4 uses augmentation with a random number to provide replay protection (i.e., protection from an attacker trying to reuse captured or old information), any other technique that modifies the hashed secrets in a unique way that is verifiable by a receiving entity (and not by an attacker) could be used instead.

Further, the combination of random number augmentation with encryption provides both replay protection and confidentiality in the event that a data transfer is being negotiated over an open communication channel. In particular, random number augmentation provides replay protection because the random number changes for each data transactions and, thus, is essentially only good for one transaction. Encryption, on the other hand, provides a degree of confidentiality but, in the event an attacker overcomes the encryption, does not provide replay or reuse protection as does random number augmentation.

In cases where two entities or parties negotiate repeatedly and exchange secrets after negotiation, one of the entities could conceivably save a hashed secret value received from the other entity during an earlier negotiation and use that saved hashed secret to cause a false match at block 66. To prevent such a false mismatch, the well known Diffie-Hellman technique may be used to generate unique shared secret values for each negotiation. In particular, when generating hashed data, the entities or parties to the negotiation may use their unique shared secret values to perform a keyed hashing of the secrets associated with the entities. Keyed hashing techniques are well known and, thus, are not described further herein. Those having ordinary skill in the art will recognize that techniques other than Diffie-Hellman and keyed hashes may be used. In particular, any techniques that provide a secret that is shared by negotiating entities and which is unique to the negotiation may be used instead of the Diffie-Hellman technique. Additionally, any techniques that modify a resulting hash in a repeatable, non-reversible manner may be used instead of keyed hashes.

The example methods described in connection with FIGS. 3 and 4 can be easily adapted for use with shared secret negotiations involving more than two entities or parties. For example, a first party may negotiate with a second party to develop a reduced list of all matching hashed secrets. The first party may then negotiate with a third party, starting with the reduced list, to form a new reduced list containing matches between the list of the third party and the reduced list resulting from the negotiation between the first and second parties. This process continues until all parties involved in the shared secret negotiation have negotiated with the first party, which results in a final reduced list of hashed secrets that are shared between all the parties involved. Of course, if the involved parties do not have at least one common shared secret, the final list will be empty.

Figure 5:
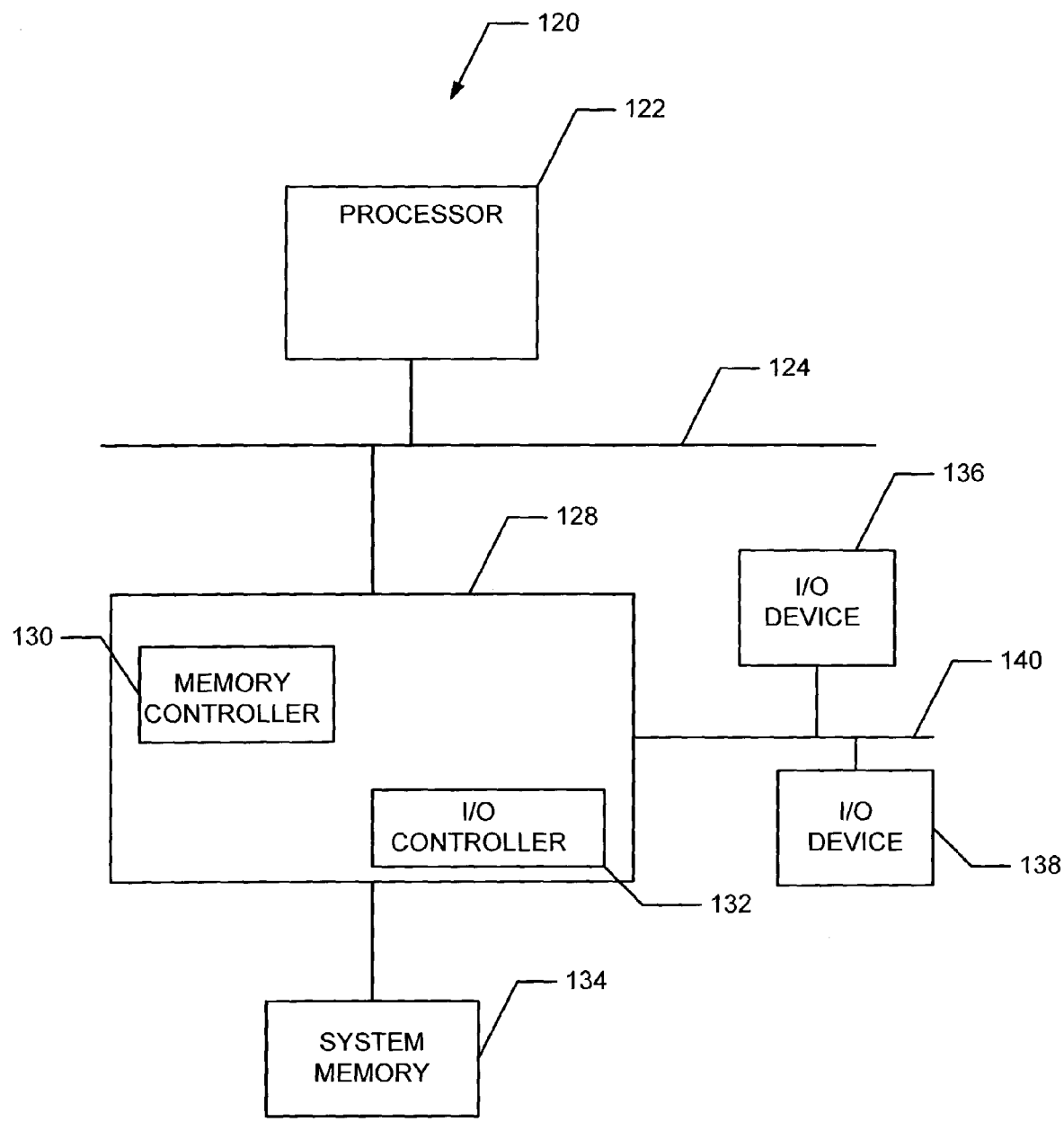
FIG. 5 is a block diagram of an example processor system that may be used to implement the apparatus and methods described herein.

FIG. 5 is a block diagram of an example processor system 120 that may be used to implement the apparatus and methods described herein. As shown in FIG. 5, the processor system 120 includes a processor 122 that is coupled to an interconnection bus or network 124. The processor 122 may be any suitable processor, processing unit or microprocessor such as, for example, a processor from the Intel Itanium® family, Intel X-Scale® family, the Intel Pentium® family, etc. Although not shown in FIG. 5, the system 120 may be a multi-processor system and, thus, may include one or more additional processors that are identical or similar to the processor 122 and which are coupled to the interconnection bus or network 124.

The processor 122 of FIG. 5 is coupled to a chipset 128, which includes a memory controller 130 and an input/output (I/O) controller 132. As is well known, a chipset typically provides I/O and memory management functions as well as a plurality of general purpose and/or special purpose registers, timers, etc. that are accessible or used by one or more processors coupled to the chipset. The memory controller 130 performs functions that enable the processor 122 (or processors if there are multiple processors) to access a system memory 134, which may include any desired type of volatile memory such as, for example, static random access memory (SRAM), dynamic random access memory (DRAM), etc. The I/O controller 132 performs functions that enable the processor 122 to communicate with peripheral input/output (I/O) devices 136 and 138 via an I/O bus 140. The I/O devices 136 and 138 may be any desired type of I/O device such as, for example, a keyboard, a video display or monitor, a mouse, etc. While the memory controller 130 and the I/O controller 132 are depicted in FIG. 5 as separate functional blocks within the chipset 128, the functions performed by these blocks may be integrated within a single semiconductor circuit or may be implemented using two or more separate integrated circuits.

As can be seen from the examples described herein, the use of hashed secrets enables a plurality of entities or parties (e.g., communication devices, data/application servers, etc.) that interact with one another (e.g., to carry out a data transfer) to discover shared secrets without revealing non-shared secrets. Such secrets may be digital certificates, digital signatures, message authentication code keys, ephemeral Diffie-Hellman parameters, etc. In general, the secrets may be any information that enables a receiving device (e.g., a client device) to authenticate the veracity of the origin of the information (e.g, data, a program, etc.) being received. Cryptographic techniques and replay protection (e.g., random number augmentation) may be used to exchange the hashed secrets via a public communication channel to prevent unauthorized or attacking entities from discovering secrets. The parties may compare their hashed secrets to the hashed secrets received from the other party to identify any matches. A single best match may be agreed upon and the parties may use knowledge of their respective hashing methods to recover the original secret from the hashed matching secret and to enable subsequent use of the shared secret (e.g., to carry out a data transfer) to occur. The use of hashed data (e.g., hashed digital certificates) reduces the amount of data that must be communicated via the communication channel during the shared secret negotiation process. In addition, the apparatus and methods described herein may be more generally applied to shared secret negotiations involving more than two parties.

While the examples described herein focus on the downloading of applications (i.e., executable programs), the apparatus and methods described herein can be generally applied to any type of data. For example, ring tones for phones, small amounts of data for applications that are already installed on phones, PDAs, etc. could be downloaded as well.

Although certain methods and apparatus have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method comprising:
   receiving a first group of hashed secrets from a communication device;
   comparing the first group of hashed secrets to a second group of hashed secrets associated with an application server;
   identifying a shared secret among the first and second groups of hashed secrets; and
   sending an application associated with the shared secret to the communication device via a communication channel.

2. A method as defined in claim 1, wherein receiving the first group of hashed secrets from the communication device includes receiving hashed digital certificates associated with the communication device.

3. A method as defined in claim 1, wherein identifying the shared secret among the first and second groups of hashed secrets includes identifying a shared digital certificate.

4. A method as defined in claim 1, wherein receiving the first group of hashed secrets includes receiving secrets that have been augmented with a random number.

5. A method as defined in claim 1, wherein receiving the first group of hashed secrets includes receiving encrypted secrets.

6. An application server, comprising:
   secure information stored within the application server;
   a communications interface adapted to be coupled to a communication channel; and
   a processor unit programmed to cause the application server to:
   receive a first group of hashed information from a communication device via the communications interface;
   hash at least a portion of the secure information to form a second group of hashed information;
   compare the first group of hashed information to the second group of hashed information; and
   identify a shared secret among the first and second groups of hashed information.

7. An application server as defined in claim 6, wherein the secure information includes a plurality of digital certificates.

8. An application server as defined in claim 6, wherein the communication channel includes a public communication channel.

9. A machine accessible medium having data stored thereon that, when executed, causes a machine to:
   receive a first group of hashed secrets from a communication device;
   compare the first group of hashed secrets to a second group of hashed secrets associated with an application server;
   identify a shared secret among the first and second groups of hashed secrets; and
   send an application associated with the shared secret to the communication device via the communication channel.

10. A machine accessible medium as defined in claim 9 having data stored thereon that, when executed, causes the machine to receive the first group of hashed secrets from the communication device by receiving hashed digital certificates associated with the communication device.

11. A machine accessible medium as defined in claim 9 having data stored thereon that, when executed, causes the machine to identify the shared secret among the first and second groups of hashed secrets by identifying a shared digital certificate.

12. A communication device, comprising:
    secure information stored within the communication device;
    a communications interface adapted to communicate via a communication channel; and
    a processor unit programmed to cause the communication device to:
    receive a first group of hashed information via the communication channel;
    hash at least a portion of the secure information to form a second group of hashed information;
    compare the first and second groups of hashed information to identify matching information; and
    receive data via the communication channel based on the matching information.

13. A communication device as defined in claim 12, wherein the secure information includes a digital certificate associated with the communication device.

14. A communication device as defined in claim 12, wherein the communications interface includes a wireless communication interface.

* * * * *